United States Patent
Nilsen et al.

(10) Patent No.: US 12,307,293 B2
(45) Date of Patent: May 20, 2025

(54) DATA PROCESSING SYSTEMS

(71) Applicant: Arm Limited, Cambridge (GB)

(72) Inventors: Andreas Danner Nilsen, Trondheim (NO); Mark Underwood, Cambridge (GB); Arne Aas, Cambridge (GB); Andreas Due Engh-Halstvedt, Trondheim (NO); Shan Wu, Trondheim (NO)

(73) Assignee: Arm Limited, Cambridge (GB)

( * ) Notice: Subject to any disclaimer, the term of this patent is extended or adjusted under 35 U.S.C. 154(b) by 537 days.

(21) Appl. No.: 17/705,856

(22) Filed: Mar. 28, 2022

(65) Prior Publication Data
US 2022/0382587 A1   Dec. 1, 2022

Related U.S. Application Data

(60) Provisional application No. 63/194,351, filed on May 28, 2021.

(51) Int. Cl.
*G06F 9/50* (2006.01)
*G06F 9/38* (2018.01)

(52) U.S. Cl.
CPC .......... *G06F 9/5016* (2013.01); *G06F 9/3838* (2013.01); *G06F 9/5038* (2013.01); *G06F 9/5044* (2013.01); *G06F 2209/5011* (2013.01)

(58) Field of Classification Search
CPC .... G06F 9/5016; G06F 9/3838; G06F 9/5038; G06F 9/5044; G06F 9/5011; G06F 9/5061; G06F 2209/508
See application file for complete search history.

(56) References Cited

U.S. PATENT DOCUMENTS

| | | | | |
|---|---|---|---|---|
| 2005/0081206 A1* | 4/2005 | Armstrong | .......... | G06F 11/3612 718/100 |
| 2005/0149940 A1* | 7/2005 | Calinescu | ............. | G06F 9/5061 718/104 |
| 2009/0296580 A1* | 12/2009 | Williams, Jr. | .......... | H04L 47/34 370/235 |
| 2010/0114824 A1* | 5/2010 | Krishnaprasad | .... | G06F 11/2094 707/637 |
| 2010/0250809 A1* | 9/2010 | Ramesh | .................. | G06F 9/526 710/200 |
| 2012/0159495 A1* | 6/2012 | Rajagopalan | ......... | G06F 9/5066 718/102 |
| 2012/0224482 A1* | 9/2012 | Gramling | ............... | G06Q 30/06 370/231 |
| 2012/0310881 A1* | 12/2012 | Shadmon | .............. | G06F 16/273 707/613 |

(Continued)

*Primary Examiner* — Tuan C Dao
(74) *Attorney, Agent, or Firm* — Pearl Cohen Zedek Latzer Baratz LLP

(57) ABSTRACT

A data processing system is disclosed that includes one or more processors that can perform producer processes to produce work and consumer processes that can consume work produced by a producer process. The system includes a pool of plural communication resources that may be used for communications between a producer process and a consumer process. The system tracks the usage of communication resources of the pool of communication resources, and allocates a communication resource from the pool of communication resources based on the tracking.

19 Claims, 11 Drawing Sheets

(56) References Cited

U.S. PATENT DOCUMENTS

| | | | | |
|---|---|---|---|---|
| 2013/0013767 A1* | 1/2013 | Stober | ............... | G06F 9/44505 |
| | | | | 709/224 |
| 2013/0029637 A1* | 1/2013 | Hillier | ................ | H04W 8/26 |
| | | | | 455/411 |
| 2013/0138896 A1* | 5/2013 | McKenney | ......... | G06F 13/1663 |
| | | | | 711/147 |
| 2014/0379593 A1* | 12/2014 | Koehler | ............... | G06F 21/105 |
| | | | | 705/318 |
| 2015/0033224 A1* | 1/2015 | Maheshwari | ......... | G06F 9/5011 |
| | | | | 718/1 |
| 2016/0366224 A1* | 12/2016 | Bonagiri | ............ | H04L 67/1097 |
| 2017/0220474 A1* | 8/2017 | Dice | ................ | G06F 16/1767 |
| 2017/0329635 A1* | 11/2017 | Rathke | ................ | G06F 30/20 |
| 2021/0096927 A1* | 4/2021 | Zhu | ................ | G06F 11/301 |

* cited by examiner

```
R0 = PICK_A_FREE_SB
WORKITEM_A

PICK_A_FREE_SB
SIGNAL R0 <handler>
```
— 500

```
R0 = PICK_A_FREE_SB
WORKITEM_B

// add dependency
WAIT R0

PICK_A_FREE_SB
WORKITEM_C
```
— 550

FIG. 5

DATA PROCESSING SYSTEMS

CLAIM OF PRIORITY

This application claims priority to U.S. Provisional Patent Application No. 63/194,351, titled "DATA PROCESSING SYSTEMS," filed May 28, 2021, which is incorporated by reference herein in its entirety.

BACKGROUND

The technology described herein relates to data processing systems, and in particular to the situation where plural processes being performed in a data processing system share a resource of the data processing system, e.g. for communication purposes.

In many data processors and data processing systems, there may be multiple processes running simultaneously, which processes need to communicate with each other. For example, a "producer" process may be generating data that is to be consumed by a "consumer" process. In this case, the producer process may write the data to a memory allocation (a memory region) that is shared with the consumer process that is to use the data, such that the consumer process can read the data from the shared memory allocation once the producer process has written the data to the shared memory allocation.

In other cases, there may be a need to synchronise the operation between different processes, such as a producer process and a consumer process, in a data processor or data processing system. For example, a consumer process may need to wait for a producer process to complete its process before the consumer process can start. In this case, one or more "scoreboards" (counters) may be used to track progress of the producer process and/or by the producer process to signal to the consumer process when the producer process has finished its work (or otherwise to synchronise the operation of the producer and consumer processes).

This may particularly be the case where there is an "overall" producer process for which the work is done by the producer process spawning one or more independent sub-processes (that may, e.g., be performed on other processors). In this case, the overall producer process may start one or more sub-processes for performing the work, and continue to do that, without waiting for any of the sub-processes to complete before doing so. There may then be a need to trigger the updating of a shared "scoreboard" when the relevant producer sub-processes have completed.

In general, there may be multiple sets of, e.g. producer and consumer, processes that need to be able to communicate with each other in some way in a data processor and data processing system, and the system will generally therefore provide a pool of plural similar resources, e.g. scoreboards, that can be used for this purpose. Then, when a pair (or more) of processes need to be able to communicate with each other, a communication resource or resources from the pool (e.g. a scoreboard or a memory allocation) will be allocated for the use of those processes.

However, the Applicants have recognised that existing mechanisms for allocating such resources, such as scoreboards, from a pool of resources to processors that may need them to communicate with each other may be relatively inefficient, e.g. in terms of creating dependencies between in fact unrelated processes, and/or delays in processes being able to be performed as a result of the required communication resources being unavailable.

The Applicants believe therefore that there remains a need for improved systems and techniques for allocating such resources in data processors and data processing systems.

BRIEF DESCRIPTION OF THE DRAWINGS

Various embodiments of the technology described herein will now be described by way of example only and with reference to the accompanying drawings, in which:

FIG. 5 illustrates producer and consumer command streams according to an embodiment;

Like reference numerals are used for like components where appropriate in the drawings.

DETAILED DESCRIPTION

Figure 1:
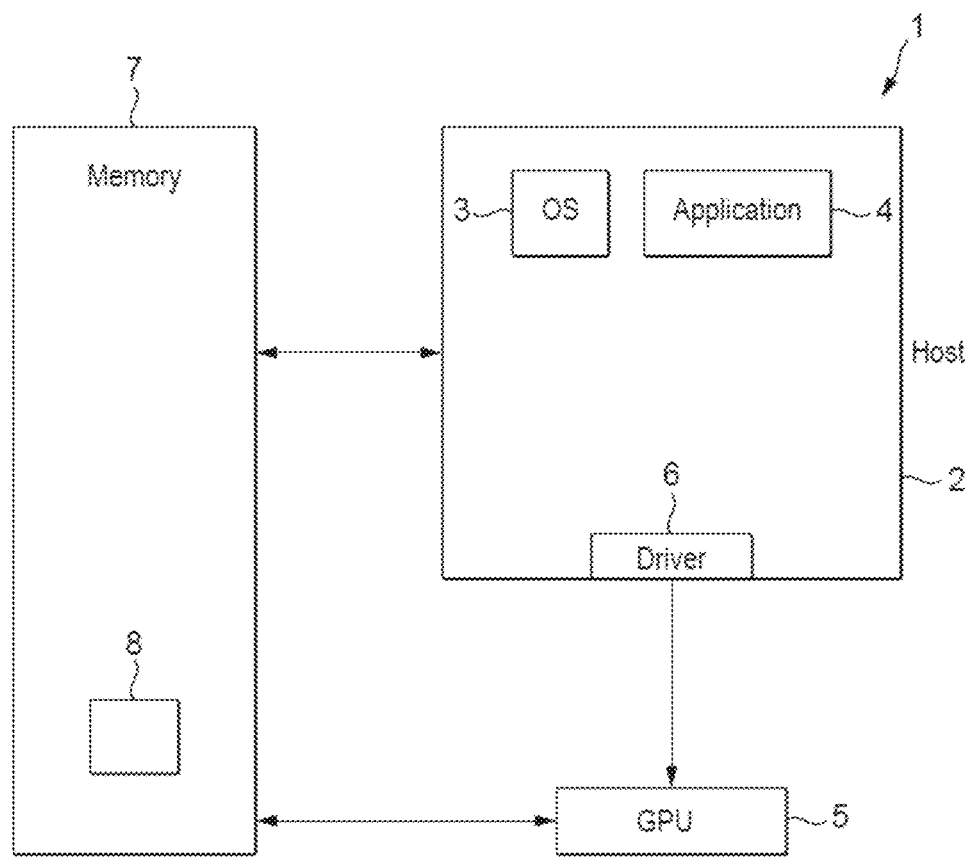
FIG. 1 shows an exemplary graphics processing system that may be operated in accordance with an embodiment.

A first embodiment of the technology described herein comprises a data processing system comprising:
one or more processors operable to perform producer processes to produce work to be consumed by a consumer process and consumer processes that will consume work produced by a producer process; and
a pool of plural communication resources that may be used for communications between a producer process and a consumer process;
the data processing system further comprising:
one or more communications resource tracking circuits configured to track the usage of communications resources of the pool of communications resources by producer processes and consumer processes; and
a communications resource allocation processing circuit configured to allocate a communications resource from the pool of communications resources for use by a producer process that needs to communicate with a consumer process based on the tracking of the usage of communications resources of the pool of communications resources by producer processes and consumer processes.

A second embodiment of the technology described herein comprises a method of operating a data processing system, the data processing system comprising:
one or more processors operable to perform producer processes to produce work to be consumed by a consumer process and consumer processes that will consume work produced by a producer process; and a pool of plural communication resources that may be used for communications between a producer process and a consumer process;

the method comprising:

tracking the usage of communications resources of the pool of communications resources by producer processes and consumer processes; and when a producer process requires a communications resource from the pool of communications resources for use when communicating with a consumer process, allocating a communications resource from the pool of communications resources for use by the producer process based on the tracking of the usage of communications resources of the pool of communications resources by producer processes and consumer processes.

The technology described herein relates to the operation of data processing systems where producer and consumer processes use a communication resource when communicating with each other (e.g., and in an embodiment, to synchronise their operations).

In the technology described herein, there is a pool of plural communications resources that are available for such use, and a producer process and a consumer process that need to communicate with each other are allocated one (or more) of the communication resources from the pool for their use.

However, rather than the allocation of communication resources from the pool to a producer process and consumer process that needs such a resource being based on a predetermined allocation (e.g. by being specified in advance which communications resource will be allocated to the producer process and consumer process), in the technology described herein the use of the communication resources by producer and consumer processes is tracked, and then a communication resource to be used for a producer process and consumer process is allocated for use by the producer process and the consumer process on the basis of that tracking.

This then allows communications resources to be allocated to producer processes and consumer processes as they become available (free) and in a dynamic manner, rather than there having to be an allocation predetermined in advance. This can then provide more efficient allocation of the communications resources from the pool to producer and consumer processes that require them, and that can, for example, avoid unnecessary dependencies on (and thus delays caused by) unrelated work that may also be in progress.

Furthermore, in the technology described herein, the use of the communications resources by both producer processes and consumer processes is tracked. The Applicants have recognised in this regard that this facilitates an improved dynamic allocation scheme, and that can avoid, for example, a communications resource being reallocated for a new use, when in fact it may still be required. This may in particular be important in the case where the data processing system supports and uses "deferred" operations, for example where although a producer process may have finished using the shared resource, a consumer process will still need to access that communication resource at a later time (and it may not, e.g., be known when that later time will be). By tracking the usage of the communications resources both for producer processes and for consumer processes, the incorrect freeing (reallocating) of a communications resource can be reduced or avoided.

The technology described herein can be used in any desired and suitable data processing system. In an embodiment, the data processing system is a graphics processing system.

The processor that is performing the producer process can be any suitable and desired processor of a data processing system that may execute a producer process. In an embodiment, the processor is a graphics processor.

The processor that is performing the consumer process can correspondingly be any suitable and desired processor. Again, in an embodiment, it is a graphics processor.

The processor that is performing the producer process may be the same processor as is performing the consumer process. Thus there may be a single processor that is performing both the producer and the consumer processes. Alternatively, the producer process may be performed on a first processor, with the consumer process being performed on a second, different processor. The producer process and the consumer process may in some cases be (part of) the same (overall) process.

The producer process may be any form of producer process that is performing work, the result of which will then be consumed by a consumer process. In an embodiment, the producer process is a process that produces data that will then be used by the consumer process. In an embodiment, the producer process is a graphics process that produces data that will then be consumed by another graphics process. For example, the producer process may be a tiling process (to generate primitive lists in a tile-based graphics processor), with the consumer process then being, for example, a rendering (e.g. fragment shading) process that will use the primitive lists generated by the producer process.

In an embodiment, the producer process (the overall producer process) (and the work for that process) is performed as one or more independent sub-processes (that may, e.g., happen on other processors), which independent sub-processes are in an embodiment spawned (issued and controlled) by the overall producer process. In this case, the overall producer process in an embodiment starts work as one or more sub-processes which are then independently completed) (with the overall producer process being "completed once all the relevant sub-processes have been completed).

Other arrangements would, of course, be possible.

The technology described herein relates to the situation where a producer process needs to communicate with a consumer process (or more than one consumer process). This communication may be to provide data from the producer process to the consumer process (for use by the consumer process) (and in one embodiment that is the case).

However, the communication could also or instead be in terms of the state or status of the producer process, for example to indicate the progress of the producer process, such as when the producer process has finished (some or all of) the work it is doing for the consumer process (and in an embodiment, this is the case). Thus the communication between the producer process and the consumer process may relate to synchronisation events, to allow the operation of the consumer process to be synchronised to the producer process (and in an embodiment that is the case).

It could also be the case that multiple types of information need to be communicated between the producer process and the consumer process, such as both data to be used by the consumer process and status events, such as synchronisation events, e.g., and in an embodiment, to indicate progress of the producer process (for example). Thus, within a set of a producer process and a consumer process that need to communicate with each other, there can be multiple types of information that need to be communicated between the processes.

Equally, and in general, and in an embodiment, there may be plural sets of producer processes and consumer processes being performed at the same time, each of which need to communicate one or more, and potentially multiple, types of information between each other. For example, there may be a plurality of respective pairs of producer processes and consumer processes that are operating together.

It would also be possible for a producer process to communicate with plural consumer processes via a given communications resource, for example where there is more than one consumer process that needs and is to use the product of the producer process.

To facilitate this, as discussed above, the technology described herein provides a pool of plural communications resources for use by respective sets of producer and consumer processes. The communications resources that are provided in this regard may be any suitable and desired such resources, and may depend, for example, upon the nature of the communication that is required to be supported.

In an embodiment, the communications resources comprise a respective shared memory allocation (i.e. a region of memory to which the producer process can write data and from which the consumer process will read that data).

In an embodiment, the communications resource comprises a mechanism for tracking and/or signalling synchronisation events, and in an embodiment for tracking the progress of the producer process. This can take any suitable and desired form, but in an embodiment is in the form of a "scoreboard", and in an embodiment in the form of a counter, that can be appropriately incremented and decremented to track the progress of a producer process and/or control synchronisation between the producer process and a consumer process.

In one such embodiment, the communications resources comprise a pool of "scoreboards" (counters) that can be used to track the progress of a producer process (and/or respective sub-processes of an overall producer process) (i.e. to determine and indicate when the producer process or sub-process has completed the work in question).

In one such embodiment (and as will be discussed further below) the system uses two types of scoreboards (counters), "local" scoreboards within the producer processes (and their sub-processes) that track the completion of the producer processes/sub-processes, and separate, "shared" scoreboards (counters) which signal synchronisation events to the consumer processes (e.g., and in an embodiment, once a relevant producer sub-process or sub-processes have been completed). In this case, the producer process will, for example, increment a local scoreboard to indicate that it has started work, and, e.g., spawn an appropriate sub-process to perform that work, with that work being tracked on the local scoreboard and the local scoreboard decremented when the work is done. A, e.g. deferred synchronisation command, is in an embodiment also issued which will wait for the local scoreboard to become zero and then increment the shared scoreboard to signal to the consumer process that the work in question has been done.

In this case, the method of the technology described herein is in an embodiment used to allocate local scoreboards from a pool of scoreboards to producer processes.

It should be noted in this regard that even these local scoreboards will still be part of the producer to consumer "synchronisation" communication, and that a consumer process will effectively be using the corresponding local scoreboard (and so that will be tracked in the manner of the technology described herein), because the state of the local scoreboard will need to be monitored and checked as part of the process for communicating the completion of the work (and ensuring the appropriate synchronisation) between the producer process and the consumer process. For example, even if a local scoreboard for a producer process has become zero (indicating that the producer process has been completed), it may be the case that the state of that local scoreboard still needs to be checked for the purpose of then signalling the completion of the work to the consumer process, and thus in that case the consumer process will still be "using" the local scoreboard until that determination (and the corresponding, e.g. shared scoreboard, synchronisation update) has been performed.

In an embodiment, the system provides plural different types of communication resource, such as, and in an embodiment, a pool of memory allocations and a pool of scoreboards (counters). In this case therefore there may be, and is in an embodiment, plural different pools of communications resources (with each pool comprising a pool of the same type of communications resource), with the communications resources in each pool then, in an embodiment, being allocated to sets of producer and consumer processes in the manner of the technology described herein.

A (and each) pool of plural communications resources can comprise any suitable and desired (plural) number of such resources. For example, in the case of memory allocations, there may be of the order of 40 memory allocations in a pool. For scoreboards, there may be of the order of 40 sets of scoreboards in the pool, with each set comprising, e.g., of the order of 16 scoreboards, and being able to be allocated to a respective process. For example, a process could be allocated one scoreboard set for tracking its own work and one set for passing synchronisation events to other processes.

In the technology described herein, the use of the communications resources in the pool of communications resources by producer processes and consumer processes is tracked. It should be noted in this regard that the use of the resources both by producer processes and by consumer processes is tracked. This facilitates dynamic allocation of the communications resources, even in the situation where it cannot be known when the resource is free by looking at the resource itself, or by looking at only one of the processes. In particular, the Applicants have recognised that there can be situations where a communications resource may appear to be free based on looking at the resource itself, or considering only one of the producer or consumer processes, but in fact should not be freed and reallocated at that time, because it is in fact still required in its current state, e.g. for communication to and/or by a consumer process. By tracking the use of the communications resources by both producer processes and consumer processes, the technology described herein takes account of this.

The usage of the communications resources in the pool by the producer processes and the consumer processes can be tracked in any suitable and desired manner.

In an embodiment, this is done by tracking, for each (currently active) producer process (e.g. a producer process that is using at least one communications resource), which communications resource of the pool the producer process is (currently) (still) using, and correspondingly, by tracking for each (currently active) consumer process (e.g. a consumer process that is using at least one communications resource), which communications resource of the pool that consumer process is (currently) (still) using (e.g. waiting on).

Thus, a record is in an embodiment maintained for a producer process, indicating which communications resources that producer process is using. This will be, and is in an embodiment, done at least for each producer process that is currently using at least one of the communications resources. Correspondingly, a record is in an embodiment maintained for a consumer process that is currently using at least one communications resource, of which of the communications resources that consumer process is using. Again, this is in an embodiment done at least for each of the consumer processes that are currently using at least one of the communications resources.

It should be noted here that while the respective usage records (for example) may be maintained by the processes themselves, that is not essential and in embodiments other elements or components of the system maintain and use (at least some of) the per-process usage records. For example, a producer process may maintain its own usage record, but the usage by the consumer processes may be maintained and tracked, e.g., by a controller that controls the sending of synchronisation events to consumer processes, rather than by the consumer processes themselves.

These usage records can take any suitable and desired form. For example, they may be in the form of respective bitmaps, e.g. one for each producer process and one for each consumer process, which bitmaps have entries corresponding to the communications resources and that can be set to indicate whether the communications resource that the bitmap entry relates to is being used by the producer/consumer process in question or not. Other arrangements would, of course, be possible.

In an embodiment, the tracking of the use of the communications resources by producer and consumer processes also takes account of any rescheduling, and in particular de-scheduling, of any of those processes. For example, and in an embodiment, in the case where a process that is using a communications resource is de-scheduled for any reason, then the tracking information for the communications resources that the de-scheduled process was using is in an embodiment updated to reflect that the process is no longer using those communications resources. This may then allow the communications resource to be freed for use by another set of a producer and consumer process, for example.

The tracked usage of the communications resources by the producer processes and the consumer processes is then used when allocating communications resources to a set of a producer process and consumer process that requires a communications resource from the pool. This can be done in any suitable and desired manner.

In an embodiment, the usage records for all of the relevant producer processes and consumer processes of the system are considered, e.g. combined in some way, to identify which, if any, of the communications resources of the pool are not currently in use at all. Where the tracking is performed using respective tracking bitmaps for the producer and consumer processes and the bitmaps show "resources not in use", then this can be done by ANDing all the appropriate (relevant) bitmaps to determine if any of the communications resources represented by the bitmaps are currently free (not in use). Correspondingly, where the bitmaps show "resources in use", the bitmaps may be NORed to determine if any of the communications resources represented by the bitmaps are currently free (not in use).

When, from the tracking information, it is identified that a required communications resource is free, then that resource will be allocated to the producer process (and consumer process) that requires it. In this case, the operation could simply allocate the first free communications resource that was found (e.g. on a find first basis) (and in one embodiment that is what is done), or a more sophisticated allocation scheme could be used if desired.

The allocation of a resource in an embodiment indicates to the producer process that requires the resource an appropriate identifier for the resource, such as an index, to indicate which communications resource it should use. The producer process will then use the identified communications resource appropriately, e.g. use it for the required communications purposes, signal the resource to the appropriate consumer process, etc.

On the other hand, when, from the tracking information, it is determined that there are no available (free) communications resources, then in an embodiment the producer process is informed of that, and is in an embodiment stalled, e.g., and in an embodiment until a communications resource becomes free. In this case, the system could operate to allocate the next available communications resource once a communications resource becomes free, or the producer process could be required to try again (repeat its request) to obtain a communications resource, e.g. after a particular wait time, or in response to some event.

The need for a communications resource (and the allocation of a communications resource) can be indicated and triggered in any suitable and desired manner. In an embodiment, a producer process that requires a communications resource does this when it requires the communications resource, e.g., and in an embodiment, by sending an appropriate request, e.g., and in an embodiment, to the communications resource allocation circuit. In response to this, the communications resource allocation circuit (process) will correspondingly operate to determine whether there is an available communications resource and if so, allocate an available communications resource to the process accordingly.

The request for a communications resource can take any suitable and desired form, and may, and in an embodiment does, for example, indicate the type of communications resource that is required (in particular in the case where there may be plural pools of different types of communication resource).

A producer process can request a communications resource in any suitable and desired manner, for example, and in an embodiment, by sending an appropriate signal, e.g. command, to do that.

In an embodiment, the producer and consumer processes in the data processing system are triggered and controlled by the execution of appropriate command streams for those processes. For example, a driver for the processor may prepare a command stream containing commands (instructions) to be performed by the processor, and provide the command stream to the processor, with the processor then performing the commands (the operations indicated by the commands) in the command stream. There may in this regard be plural respective different command streams to be executed, e.g. for each respective producer process and consumer process to be executed. Each command stream may, for example, contain commands (instructions) to set parameters for processes (processing tasks), as well as commands (instructions) to execute the processes (processing tasks). The processor will then work its way through the command stream or streams, executing the commands (instructions) in the command stream, in turn.

In this case, the need to request a communications resource and the requesting of a communications resource is in an embodiment indicated and triggered by including an appropriate command to that effect in a command stream to be executed (e.g. and in an embodiment for a producer process). Thus in this case, the command stream for a, for example, and in an embodiment, producer process will include a command to request the appropriate communications resource, with the command stream execution (the command stream execution unit) then operating when it reaches and executes that command, to trigger and perform the appropriate communications resource request and allocation. Such a command may, and in an embodiment does, indicate the type of communications resource that is required, and may, for example, be included in the command stream for the sequence of commands that performs the producer process itself.

This "communications resource request" command is in an embodiment then executed by the appropriate command stream execution unit of the processor to then determine if there is an available communications resource, and will either return the (e.g. the identity (index) of) a free resource that has been allocated for the producer process in question, or stall the execution of the producer process command stream until a communications resource is available.

Other arrangements would, of course, be possible.

As discussed above, a particular form of communication between producer and consumer processes that the technology described herein supports is synchronisation between producer processes and consumer processes, e.g. where a consumer process needs to wait for a producer process to complete some or all of its work, before the consumer process can proceed. In this case, a producer process may, for example, use a scoreboard (a counter), to indicate when it has completed its process, with a consumer process then monitoring the state of the scoreboard to determine when the producer process has completed the required work.

There may also be further synchronisation mechanisms used to assist and ensure synchronisation between producer processes and consumer processes. For example, a producer process and consumer process could use shared synchronisation objects that are stored, e.g., in memory (with the producer process, for example, setting an appropriate synchronisation object in memory, which the consumer process can then read to determine whether it can proceed or not).

In an embodiment, synchronisation between a consumer process and a producer process is performed by (and the system is correspondingly configured to):

when a producer process is producing work for use by a consumer process, and in which the consumer process needs to wait for work produced by the producer process before it can proceed:

maintaining a progress tracking record that is shared between the producer and consumer processes that can be set to indicate when the producer process has completed work required by the consumer process, and that the consumer process can check to determine whether the producer process has completed work that it requires;

the producer process issuing a deferred synchronisation command that when executed will set the progress tracking record to indicate to the consumer process that the producer process has completed work required by the consumer process in advance of the producer process completing that work, the deferred synchronisation command having an associated wait condition such that the command will not be executed until the wait condition is met;

the method further comprising:

monitoring progress of the producer process, and when it is determined from that monitoring that the wait condition for the deferred synchronisation command has been met, executing the deferred synchronisation command to update the progress tracking record; and the consumer process monitoring the progress tracking record and when the progress tracking record indicates that the producer process has completed the required work, proceeding with the consumer process.

It is believed that such arrangements for synchronising between a producer process and a consumer process may be new and advantageous in its own right.

Thus, another embodiment of the technology described herein comprises a method of operating a data processing system that comprises one or more processors operable to perform producer processes to produce work to be consumed by a consumer process and consumer processes that will consume work produced by a producer process, the method comprising:

when a producer process is producing work for use by a consumer process, and in which the consumer process needs to wait for work produced by the producer process before it can proceed:

maintaining a progress tracking record that is shared between the producer and consumer processes that can be set to indicate when the producer process has completed work required by the consumer process, and that the consumer process can check to determine whether the producer process has completed work that it requires;

the method further comprising:

the producer process issuing a deferred synchronisation command that when executed will set the progress tracking record to indicate to the consumer process that the producer process has completed work required by the consumer process in advance of the producer process completing that work, the deferred synchronisation command having an associated wait condition such that the command will not be executed until the wait condition is met;

monitoring progress of the producer process, and when it is determined from that monitoring that the wait condition for the deferred synchronisation command has been met, executing the deferred synchronisation command to update the progress tracking record; and the consumer process monitoring the progress tracking record and when the progress tracking record indicates that the producer process has completed the required work, proceeding with the consumer process.

Another embodiment of the technology described herein comprises a data processing system comprising:

one or more processors operable to perform producer processes to produce work to be consumed by a consumer process and consumer processes that will consume work produced by a producer process;

a synchronisation controlling circuit configured to maintain a progress tracking record that is shared between a producer and a consumer process that can be set to indicate when the producer process has completed work required by the consumer process, and that the consumer process can check to determine whether the producer process has completed work that it requires;

wherein:

the producer process is operable to issue a deferred synchronisation command that when executed will set a progress tracking record for the producer process to indicate to a consumer process that the producer process has completed work required by the consumer process in advance of the producer process completing that work, the deferred synchronisation command having an associated wait condition such that the command will not be executed until the wait condition is met;

the synchronisation controlling circuit further configured to:

monitor progress of a producer process, and when it is determined from that monitoring that the wait condition for a deferred synchronisation command has been met, execute the deferred synchronisation command to update the progress tracking record; and the consumer process is operable to monitor a progress tracking record and when the progress tracking record indicates that the producer process has completed the required work, proceed with the consumer process.

As will be appreciated by those skilled in the art, these embodiments of the technology described herein can, and in an embodiment do, comprise one or more or all of the optional features of the technology described herein, as appropriate.

These embodiments of the technology described herein provide a fast and low cost method for synchronising between a producer process and a consumer process, that can, in particular, and as will be discussed further below, be used at least in the case where it is acceptable for the processing of the synchronisation commands to be done in order. It can signal synchronisation between processes in a quick and low cost manner. In particular, the producer process needs simply to send the synchronisation command, the monitoring of the wait condition can easily be done every cycle, and the operation can react quickly to the wait condition being met.

The progress tracking record that is shared between the producer process and the consumer process in this regard can comprise any suitable and desired such record. In an embodiment it comprises a counter, which is in an embodiment incremented by the deferred synchronisation command issued by the producer process when executed (when the wait condition for the deferred synchronisation command is met), with the consumer process monitoring the counter and waiting while the counter is 0, but proceeding when the counter is greater than 0.

In an embodiment, where a pool of plural scoreboards (counters) is provided, the progress tracking record is a scoreboard (counter) allocated from the pool of scoreboards (counters), in an embodiment by the communication resource allocation processing circuit.

The deferred synchronisation command (that will increment the counter when executed) is issued by the producer process in advance of the producer process completing the work that the deferred synchronisation command relates to.

A deferred synchronisation command for the producer process is in an embodiment issued after appropriate commands that when executed will cause the work (that the deferred synchronisation command relates to) to be started (but which work will not necessarily be, and may not be expected to be, finished at the time the deferred synchronisation command is issued). This will help to ensure that the wait condition will not be met when the deferred synchronisation command is issued (unless the work has been completed by then).

There may be, and in an embodiment is, a sequence of work commands followed by deferred synchronisation commands for the producer process, such that the producer process will start some work being performed, and then issue a deferred synchronisation command for that work, and then start some further work being performed, and then issue a further deferred synchronisation command for that work, and so on (as desired). Thus, the producer process in an embodiment comprises sequences of commands to perform work, interspersed with commands to issue the appropriate deferred synchronisation command, where the consumer process needs to be synchronised (to wait for) work performed by the producer process to complete.

As discussed above, in an embodiment, the producer process may issue (spawn) respective sub-processes to perform the work in question. Thus in this case, the producer process may spawn a sub-process to perform work, and then issue a deferred synchronisation command (which will be correspondingly executed when the sub-process in question has finished the work), then spawn another sub-process followed by a deferred synchronisation command (that will be executed when the sub-process to perform the work has been completed), and so on.

The use of deferred synchronisation commands in this way then allows the producer process to continue spawning sub-processes, while still ensuring synchronisation with a consumer process when a sub-process has completed, rather than having to wait for a sub-process to complete before, e.g. spawning further sub-processes. Thus the producer process in an embodiment comprises sequences of commands to spawn sub-processes to perform work, interspersed with commands to issue the appropriate deferred synchronisation commands where the consumer process needed to be synchronised (to wait for) work performed by the producer process (e.g. a particular sub-process) to complete.

A deferred synchronisation command is associated with a wait condition, which must be met before the command is executed to update the progress tracking record (e.g. increment a shared counter).

The wait condition for the deferred synchronisation command can be any suitable and desired wait condition that can be used in relation to the progress of the producer process. In an embodiment, the wait condition is when work to be performed by the producer process (that the deferred synchronisation command relates to) has been completed (and in an embodiment when the results of that work are accessible to the consumer process). Thus in an embodiment, the wait condition is met when the producer process has completed work (to which the deferred synchronisation command relates).

As will be appreciated from the above, the work that needs to be completed for a given deferred synchronisation command may, and in an embodiment does, comprise work for a sub-process or sub-processes of (for) the overall producer process (that have been spawned by the overall producer process).

Thus, in an embodiment, monitoring progress of a producer process comprises monitoring when some but not all of the (overall) producer process has been completed, such as, and in an embodiment, monitoring when a respective sub-process or sub-processes of the producer process (spawned by the producer process) has been completed.

Equally, it is in an embodiment determined that the wait condition for a deferred synchronisation command has been met from the monitoring of progress of a producer process when it is determined from the monitoring that a sub-process or sub-processes of the producer process (spawned by the producer process) has been completed (e.g., and in an embodiment that the deferred synchronisation command is for (relates to)).

The deferred synchronisation commands issued by the producer process in an embodiment indicate both the progress tracking record (counter) to which the command relates, and the relevant wait condition that must be met before the command is executed (before the progress tracking record (counter) is updated by the command).

The monitoring of the progress tracking record by the consumer process can correspondingly be triggered and performed in any suitable and desired manner. This is in an embodiment done by the consumer process, when it needs to be synchronised with work produced by the producer process, checking the status of the progress tracking record, and either stalling its process if the progress tracking record does not indicate that the producer process has completed the work required by the consumer process, or continuing with the consumer process when the progress tracking record indicates that the required work has been completed by the producer process and is available to the consumer process.

In order to do this, the consumer process in an embodiment includes and executes one or more appropriate synchronisation wait commands that will cause the consumer process to wait until it is determined from the progress tracking record that the producer process has completed the required work.

In an embodiment, the consumer process also operates to update the progress tracking record to indicate that it has "consumed" the work produced by the producer process. For example, and in an embodiment, where the progress tracking record comprises a counter that is incremented by the producer process when it has completed work, the consumer process is correspondingly operable to decrement the counter when it has consumed work. In this case therefore, the current state of the counter will indicate whether and how much work there is available for the consumer process to consume.

Thus, in an embodiment, the consumer process executes one or more synchronisation wait commands, where it will check the status of the progress tracking record (counter) and if the counter has a non-zero value, will proceed and decrement the counter, but if the counter has a value of zero, will wait (stall) until the counter has a non-zero value.

The synchronisation wait commands for the consumer process are correspondingly in an embodiment followed by appropriate commands that when executed will perform the required work, using the work produced by the producer process. There may be, and in an embodiment is, a sequence of such synchronisation commands, followed by work commands, for the consumer process, such that the consumer process will, if necessary, wait for producer process work to be completed, perform some work, and then, if necessary, wait for further producer process work to be completed, and then perform further work, and so on.

The progress of the producer process (the completion of work by the producer process) to trigger the execution of a deferred synchronisation command can be monitored in any suitable and desired manner. In an embodiment, this is done by monitoring the progress of the producer process, for example, and in an embodiment, by using a scoreboard (a counter) that the producer process can set to indicate the progress of its work. In this case, the producer process in an embodiment increments the scoreboard (counter) when it starts the work in question, and then decrements the scoreboard (counter) when the work is completed (such that when the scoreboard has a value of 0, it can be determined that the work in question has been completed by the producer process).

As has been discussed above, in this arrangement there will, in effect, be a "local" scoreboard (counter) that is used to track the progress of a particular producer process (or sub-process of the producer process), with there also then being a shared scoreboard (the progress tracking record) that is used to indicate to a consumer when work that is required has been completed (by executing the deferred synchronisation command). In this case, the method and system of the first and second embodiments of the technology described herein for allocating communications resources are in an embodiment used at least for allocating the "local" scoreboards that are to be used to track the progress of the producer process (and/or sub-processes) from a pool of such scoreboards (counters).

It will be appreciated from the above, that in operation of these embodiments of the technology described herein, a producer process will issue deferred synchronisation commands that cannot be executed until the wait condition for executing the command has been met.

Accordingly, the deferred synchronisation commands from the producer process are in an embodiment placed in a queue, and in an embodiment in a first-in first-out (FIFO) queue, while they wait for their wait conditions to be met (i.e. for the producer process work to which they relate to be completed). In this case therefore, there will be a queue of one or more deferred synchronisation commands, which are waiting to be processed once their wait conditions have been met.

To facilitate this operation, in an embodiment, the queue is handled and operated as a first-in first-out (FIFO) queue, with it being determined, e.g., and in an embodiment, every cycle, whether the wait condition for the deferred synchronisation command at the head of the queue (only) has been met or not. Then, when the wait condition for that deferred synchronisation command at the head of the queue has been met, that command is executed (e.g., and in an embodiment, its corresponding counter is incremented), and the next command in the queue (the new head of the queue) is then monitored and considered until it can be executed, and so on.

This will mean that the deferred synchronisation commands will be executed in the order that they are issued by the producer process (even if the wait condition for a later deferred synchronisation command may be met first). This therefore has the effect that the deferred synchronisation commands (and thus the corresponding consumer processes that are waiting for the corresponding work to be completed by the producer processor) will be executed in order, but the Applicants have recognised that that may often be desirable (and correspondingly the use of a first-in first-out queue in the manner of the present embodiments provides a fast and low cost mechanism for ensuring synchronisation between producer processes and consumer processes, in the case where those processes are to be executed in order (and should be executed in order in any event)).

The progress of the producer process (e.g. its scoreboard values) may be provided to the queue and the wait condition monitoring process (circuit) in any suitable and desired manner. For example, any "scoreboard" updates could be broadcast to the queue and the wait condition monitoring circuit, e.g. each cycle, so as to allow it to be determined when the wait condition for a deferred synchronisation command (e.g. at the head of the queue) has been met.

While it would be possible for a producer process simply to issue a single deferred synchronisation command for a given process that is performing for a corresponding consumer process, in embodiments, the producer process can, and in an embodiment does, issue plural (a sequence) of deferred synchronisation commands, for example as it starts successive items of work (e.g. sub-processes) that will be required by the consumer process. There may, accordingly, correspondingly be a plurality of deferred synchronisation commands in the queue, and, depending upon the execution of those commands relative to the progress of the consumer process, it may be that the counter that is shared between the producer process and the consumer process to track the progress of the producer process will be incremented to values greater than 1. This being the case, in an embodiment, if the counter reaches its maximum value, then in an embodiment the producer process is stalled, so as to allow the consumer process, to, in effect, then "catch up", and correspondingly start to decrement the counter. This may, for example, occur where the producer process has completed lots of work, but the consumer process cannot process that work "in time" to avoid the counter overflowing.

It will be appreciated that the above embodiments have primarily been described with reference to synchronisation between a producer process and a single consumer process. It would be possible for this mechanism to be used to synchronise a producer process with plural different consumer processes, if desired (and in an embodiment, that is done).

In this case, a separate synchronisation progress tracking record (counter) is in an embodiment used for each producer process and consumer process pair, but a single shared queue could be used for all the deferred synchronisation commands issued by the producer process irrespective of which consumer process (synchronisation progress tracking record (counter)) they relate to, or there could be a plurality of queues as well, e.g. one for each respective producer process and consumer process pair (which would then avoid consumer processes being delayed by having to wait for deferred synchronisation commands relating to other consumer processes to be executed first (e.g. because they are earlier in the (common) queue)).

The operation in the manner of these embodiments of the technology described herein can be triggered and controlled in any suitable and desired manner.

Again, in an embodiment, it is triggered and controlled by the execution of appropriate command streams for the producer and consumer processes, and in particular by the inclusion of appropriate deferred synchronisation commands in the command stream for a producer process, and correspondingly appropriate synchronisation wait commands in the command stream for a consumer process.

The deferred synchronisation commands included in the producer command stream in an embodiment identify the progress tracking record (counter) to which the command relates (and that should be updated when the command is executed), and also the wait condition associated with the deferred synchronisation command (e.g., and in an embodiment, in terms of the producer process progress trackers (scoreboards) that should be checked for the deferred synchronisation command). Correspondingly, the synchronisation wait commands included in a command stream for a consumer process should indicate which shared progress tracking record (counter) the wait command relates to (needs to be checked to see if the consumer process can proceed (and correspondingly updated when the consumer process proceeds)).

Other arrangements would, of course, be possible.

It will be appreciated from the above that the data processing system of the technology described herein will comprise one or more processors operable to perform producer processes and consumer processes. The processor or processors in an embodiment comprises, as discussed above, an "accelerator", such as, and in an embodiment, a graphics processor. There may be more than one processor (accelerator) if desired.

The data processing system in an embodiment also comprises a suitable host processor (CPU) that can execute applications that require the producer processes and consumer processes, and that can control the processor or processors to perform the producer processes and consumer processes accordingly.

As discussed above, this is in an embodiment done by issuing appropriate command streams to the processor or processors for execution. Thus the host processor in an embodiment also executes an appropriate driver or drivers for the processor or processors, which driver or drivers are operable to and configured to, inter alia, prepare appropriate command streams for performing the desired producer and consumer processes (e.g. in response to requests for such processes from an application), and to also include in such command streams the particular commands required for triggering and controlling operation in the manner of the technology described herein.

The data processing system may also comprise any other suitable and desired components, processors, etc. that a data processing system may normally comprise. Thus, it in an embodiment comprises and/or has associated with it appropriate memory or memories. It may also comprise an appropriate display (and, e.g., include a display controller for controlling the display).

Equally, subject to the particular requirements for operation in the manner of the technology described herein, the processor or processors that are performing the producer and consumer processes can otherwise operate and be configured in any suitable and desired manner, and include any appropriate components, elements, etc. that such processors (e.g. graphics processors) may otherwise include.

In an embodiment, the data processing system and/or processor(s) also comprises, and/or is in communication with, one or more memories and/or memory devices that store the data described herein, and/or that store software for performing the processes described herein. The data processing system and/or processor(s) may also be in communication with a host microprocessor, and/or with a display for displaying images.

The technology described herein is in an embodiment implemented in a data processing system that may include, for example, one or more processors, such as a graphics processor, a display controller (display processor), a video processor, etc., that may operate in the manner of the technology described herein, together with a host processor (CPU) and a memory or memories.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry)

and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

Embodiments of the technology described herein will now be described in the context of a graphics processing unit whose operation is controlled and triggered through the use of command streams. However, it will be appreciated that the technology described herein may generally find utility in any data processing system that includes programmable processors that execute program instructions to perform processing operations.

Thus, for the graphics processor of the present embodiment, the submission of processing work to the graphics processor is controlled using command streams (which are essentially machine code programs that can be executed by a special processor). The graphics processor is thus provided with a command stream frontend including a dedicated processing unit, a 'command stream execution unit', for interpreting and implementing the command streams.

Processing work for the graphics processor is thus specified by the host processor generating a suitable sequence of commands for implementation by the graphics processor. The host processor accordingly comprises a suitable command stream generating circuit (in the form of a driver) operable to prepare, in response to a request for processing to be performed by the graphics processor from an application being executed by the host processor, one or more command stream(s) to cause the graphics processor to perform processing tasks for the application, each command stream including a sequence of commands for implementation by the graphics processor. The command stream generating circuit acts to translate calls for processing from (applications running on) the host processor into a sequence of commands (instructions) for implementation by the graphics processor.

In the present embodiment, the sequence of commands making up a command stream is stored in an appropriate buffer or buffers. Where plural buffers are used for a command stream, they are all in an embodiment considered to be part of the same command stream (and share the same register file and other state).

The command stream buffers are stored in main (system) memory, but commands therefrom (their contents) can be prefetched/cached (e.g. in local storage of the graphics processor) when the command stream is being/is to be executed, to aid execution throughput.

In order to execute the command streams, the graphics processor is provided with a suitable command stream execution circuit (generally referred to herein as a 'command stream frontend'). The command stream frontend (circuit) may generally comprise one or more command stream interface(s) and a command stream execution unit.

The (and each) command stream interface is operable to cause the graphics processor to execute a respective command stream that has been assigned to that command stream interface. Thus, a (and each) command stream interface can have associated with it (assigned to it) a command stream buffer storing a sequence of commands (a command stream) to be implemented.

When a command stream is to be prepared and executed, a respective command stream interface is in an embodiment allocated (assigned to) that command stream.

Each command stream interface in an embodiment also comprises (has associated with it) a local memory and registry to which state values (parameters) for the processing jobs can be stored. Thus, parameters for processing jobs can be set and stored locally for each command stream interface (e.g. without having to include the state parameters explicitly in the job descriptors provided by the host processor).

The command stream frontend (circuit) also includes a command stream execution unit for implementing the commands. The command stream execution unit is thus operable to fetch commands from the one or more command buffers (that are currently assigned to a command stream interface) and to then interpret and execute those commands.

In general, any number of command stream interfaces may be provided, as desired. For instance, in some embodiments, a plurality of (e.g. two) command stream interfaces are provided. In such cases, where a plurality of command stream interfaces are provided, the command stream execution unit may, for example, process commands for the respective command stream interfaces in an alternating (e.g. round robin) fashion.

The graphics processor also includes an appropriate supervising controller, in the form of a microcontroller, that is operable to handle the scheduling of the command streams on the hardware execution resources of the graphics processor. The supervising microcontroller controls the operation of the command stream frontend, including assigning command streams to respective command stream interfaces, etc.

Some commands in a command stream will be implemented natively in hardware in the graphics processor. Others may be emulated in software by the controller. Thus, when a command in a command stream is executed, e.g. by the command stream execution unit, the instruction (or processing work) associated with that command may be implemented either in hardware or emulated by the controller. This will typically depend on the type of the command that is being executed.

For example, a command stream may contain a series of 'MOVE' commands for loading parameter values into the local memory or registry associated with that command buffer to initialise or modify the state vector. These commands can be executed in turn by the command stream execution unit in order to set the parameters for the processing job. These types of command are in an embodiment implemented natively, e.g. using appropriate command stream execution unit hardware.

The command stream execution unit is also operable to schedule processing work to be performed by the graphics processor hardware units. For example, a 'RUN' command may be executed wherein processing work is sent to the graphics processor hardware for processing. A RUN command is effectively a processing job but with the initial state (parameters) (in an embodiment) being obtained from the local memory or registry (e.g. rather than being explicitly incorporated as a job descriptor). These commands are thus implemented (natively) in the graphics processor hardware.

The hardware units of the graphics processor (and that are associated with the execution unit) in this regard may typically comprise one or more iterator(s) and one or more (in an embodiment a plurality of) processing core(s). Thus, when processing work is sent to the graphics processor hardware units, e.g. when executing a RUN command, the processing job may be sent, along with the initial state (parameters), to a respective iterator. An iterator takes the processing job and splits it up into a number of processing tasks which can then be issued to the processing core(s). The iterator can also track the completion of the processing tasks.

The iterators may be bound to a particular command stream interface. That is, each command stream interface may be associated with, and only able to submit processing jobs to, a particular set of one or more iterators. These bindings can be defined and controlled (dynamically) by the controller.

Other types of commands e.g. that are less frequent, of a more complex nature, that can be expected to have some delay, and/or that may need to wait on an external entity, may be emulated in software by the controller.

In general, any desired number of commands streams can be prepared for the graphics processor. Each command stream may relate to any suitable and desired processing work. Where multiple command streams are prepared, each command stream may relate to a different or the same type of processing task.

Figure 2:
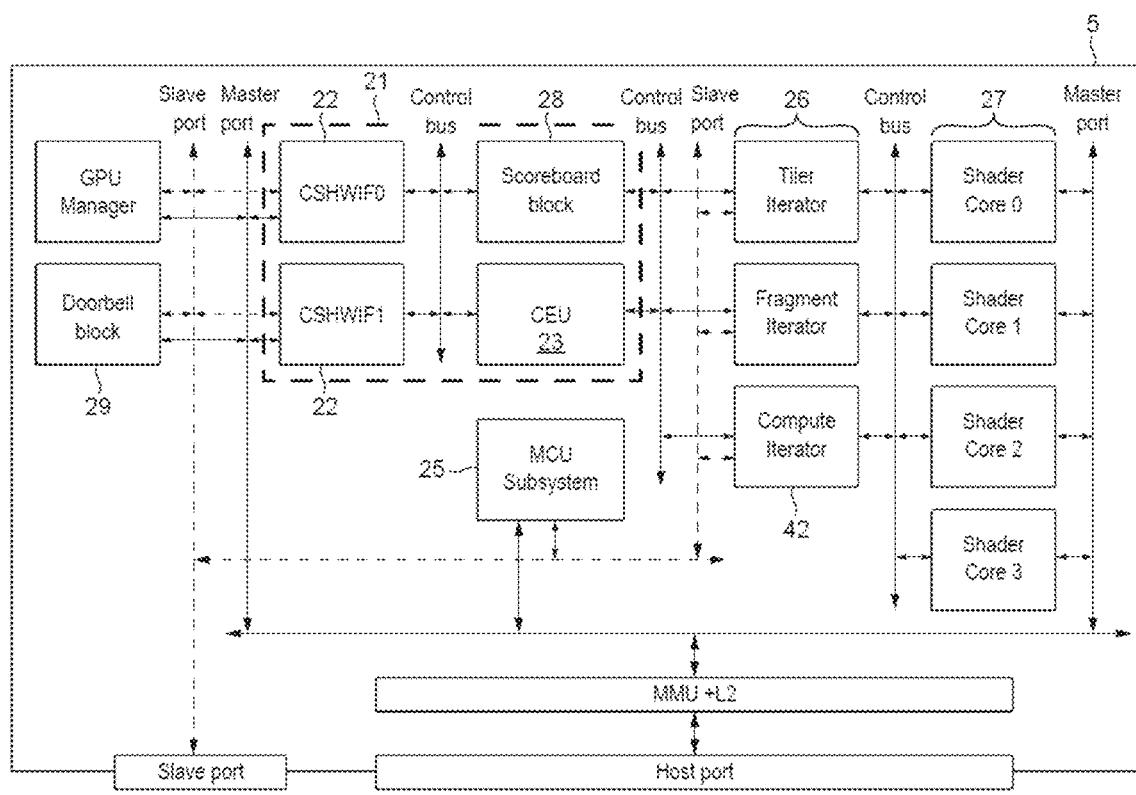
FIG. 2 shows schematically in more detail a graphics processor (including a command stream frontend) that can be operated in accordance with an embodiment.
Figure 3:
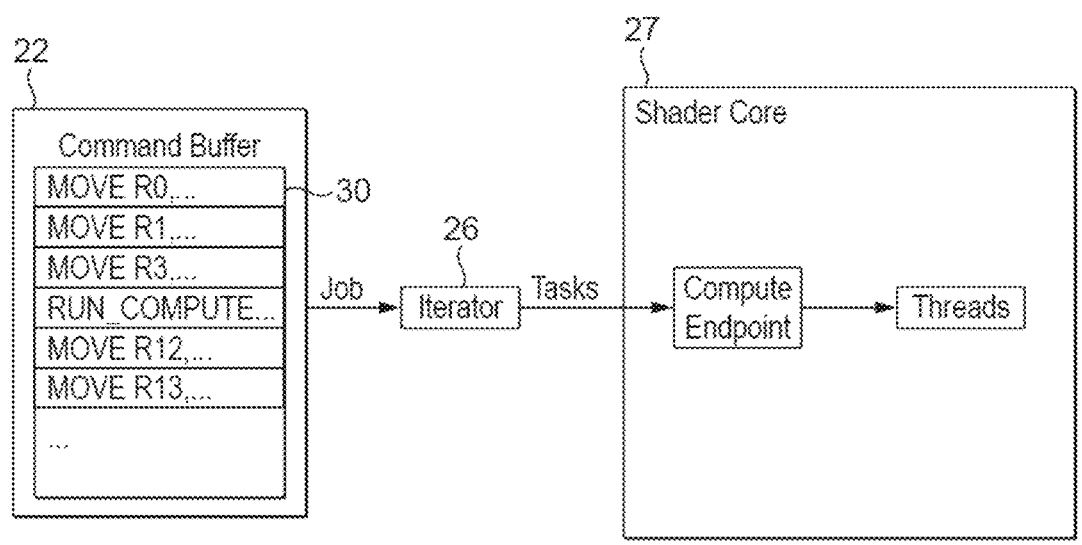
FIG. 3 shows schematically how a command stream may be executed using a graphics processor like that shown in FIG. 2.

FIGS. 1 to 3 show this arrangement and operation of the graphics processor in the present embodiments in more detail.

FIG. 1 shows an exemplary data processing system 1 that may, for instance, comprise an embedded data processing system for use, for example, in a portable electronic device, such as a mobile phone or tablet. The data processing system includes a host processor (CPU) 2 on which an operating system (OS) 3, and one or more applications 4 may execute, and a memory 7.

The data processing system also includes an associated graphics processing unit (GPU) 5 that can perform graphics processing operations for the applications 4 and the operating system 3 executing on the host processor 2. To facilitate this, the host processor 2 also executes a driver 6 for the GPU 5. For instance, an application 4 such as a game executing on the host processor 2 may require various graphics processing operations to be performed by the GPU 5. To do this, the application will generate API (Application Programming Interface) calls that are interpreted by the driver 6 to generate appropriate commands for the GPU 5 to generate the graphics output required by the application 4.

Particularly, the driver 6 is operable to generate a set of "commands" to be provided to the GPU 5 in response to requests from the application 4 running on the host processor 2 for graphics output (e.g. to generate a frame to be displayed). In the present embodiments, the appropriate commands and data for performing the processing tasks required by the application 4 are provided to the GPU 5 in the form of one or more command stream(s), that each include a sequence of commands (instructions) for causing the graphics processor to perform desired processing tasks.

The command streams are prepared by the driver 6 on the host processor 2 and may, for example, be stored in appropriate command stream buffers 8 in the memory 7, from where they can then be read into the GPU 5 for execution. Each command stream may contain commands (instructions) to set parameters for graphics processor tasks, as well as commands (instructions) to execute a task, etc.

The GPU 5 thus includes a command stream frontend for receiving and interpreting these command streams and to control job submission for the GPU 5.

FIG. 2 shows in more detail the GPU 5 including the command stream frontend 21. The command stream frontend 21 is generally operated under the control of a supervising microprocessor (MCU) 25, which handles communications with the host processor 2, and schedules the processing of active command streams on the command stream frontend 21.

The command stream frontend 21, which may be implemented as a single (hardware) functional unit, generally comprises one or more command stream interfaces 22 and a (shared) command stream execution unit 23. Each command stream interface 22 has an associated command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) are provided to the command stream execution unit 23 and then executed in turn (e.g. in a round robin fashion where multiple command stream interfaces 22 are provided). The command stream execution unit 23 thus executes the commands in turn, with the instructions either being emulated in software by the MCU 25, or assigned to the accelerator hardware, e.g. depending on the type of instruction.

In general when the command stream execution unit 23 executes an instruction, it will either perform the operation synchronously itself (e.g. a move operation), or it will "package up" a request and send it to the GPU hardware units in the case of (e.g. a run command), or it will inform the supervising MCU 25, which may then emulate the command in software.

The command stream frontend 21 also includes a scoreboard block 28 that is able to independently track the processing job completion for each of the command steam interfaces 22. The scoreboard block 28 is thus a shared resource. The scoreboard block 28 tracks the progress of the processing tasks associated with each processing job and reports this back.

As shown in FIG. 2, the GPU 5 includes a number of hardware units, such as a plurality of iterators 26 (here, separate tiler, fragment and compute iterators are provided, although other arrangements would of course be possible) and processing (e.g. shader) cores 27.

A processing job specified in a command being executed by the command stream execution unit 23 can thus be assigned and sent to a respective iterator 26, along with the current parameters held within the registry and local memory. The iterator 26 acts to break down the processing job into a set of processing tasks which can then be distributed between the processing cores 27 for processing.

The host processor 2 communicates with the MCU 25 of the GPU 5 via a shared interface memory (which may be main memory, or another suitable memory cache, depending on the configuration). Thus, when an application 4 running on the host processor 2 makes a call for processing by the GPU 5, the host processor 2 can communicate with the MCU 25 of the GPU 5 via the shared memory, and the MCU can then read the data in from the shared memory. For instance, the host processor 2 can write to a doorbell block 29 to interrupt the current operation of the MCU 25 and cause the MCU 25 to handle new work.

Once the MCU 25 receives a request from the host processor 2 to execute a command stream, the MCU 25 can then assign a respective command stream interface 22 for the command stream, and the command stream can then be loaded into a command buffer for the assigned interface (and the command stream properties written to the assigned interface). The commands are then passed in order from the command buffer to the command stream execution unit 23 which interprets the commands from the command buffers, and executes the commands using the local memory and registry information associated with that command stream interface and buffer.

When a command is executed by the command stream execution unit 23, depending on the type of instruction, the instruction may then be performed either in hardware (e.g. by the command stream execution unit 23 itself, or using the iterators 26 and shader cores 27), or may be emulated by the MCU 25. For instance, any commands e.g. for updating the local memory and registry information may typically be implemented by the command stream execution unit 23 itself in order to set the parameters for a processing job. The processing job may then be sent to the GPU hardware unit(s) for processing, along with these parameters.

FIG. 3 illustrates the execution of a command stream within a system like that shown in FIG. 2. The command stream in the command buffer 30 includes a sequence of instructions of different types, including e.g. 'MOVE' and 'RUN' commands. The MOVE commands, for example, load constants into the local memory or registry on the command stream interfaces in order to initialise or modify the state vectors for a processing job. The 'RUN' command then sends the state vector to an iterator 26 to start the processing job iteration. Various other types of commands may also be used, for instance, a 'LOAD' command may be implemented to bulk read from/write to system memory.

A 'WAIT' command may also be implemented to cause the processing to wait for the completion of any asynchronous (e.g. RUN or LOAD) commands. Correspondingly, a 'SYNC' command may be used to signal that (e.g. RUN or LOAD) commands have been completed.

MOVE, LOAD, and WAIT commands may typically be implemented within the command stream execution unit 23. SYNC commands may typically be emulated in firmware by the MCU 25.

The RUN commands may be implemented in the hardware units of the GPU. Thus, as shown in FIG. 3, when a RUN command is executed, a processing job is then sent to the respective iterator 26 (along with the state vector whose value has been initialised in the previous commands). The iterator 26 then breaks the processing job into smaller processing tasks which are then issued to the shader core(s) 27. Each shader core may comprise an endpoint that is able to take a task and issue it to thread groups within the shader core. The iterators 26 may be bound to a particular command stream interface 22 before starting an asynchronous command.

The above describes the arrangement and operation of the graphics processor shown in FIGS. 1 and 2. The operation of the graphics processing pipeline in accordance with embodiments of the technology described herein will now be described in more detail.

The present embodiments relate to the situation in which the graphics processor 5 is executing separate command streams, with one of the command streams producing data that another of the command streams consumes. An example of such a situation would be in tile based graphics processing, where a tiling process generates primitive lists for a render output to be generated, and a fragment shading process uses the primitive lists to perform fragment processing to generate the render output. In this example, the tiling process is a "producer" and the fragment shading process is a "consumer".

In the present embodiment, scoreboard block 28 maintains a pool of plural scoreboards that can be allocated for use. In the present embodiments, a "local" scoreboard will typically be used to track the completion of producer processes/sub-processes. As will be discussed in more detail below, a separate, "shared" scoreboard may then signal synchronisation events to a consumer process once a relevant producer sub-process (or sub-processes) has been completed.

In the present embodiments, each scoreboard is a counter that can be appropriately incremented and decremented to track the progress of a producer process, and to control synchronisation between the producer process and a consumer process.

In the present embodiments, a producer RUN command can increment a local scoreboard to indicate that it has started work, and spawn an appropriate sub-process to perform that work, with that work being tracked on the local scoreboard, and the local scoreboard being decremented when the work is done. A deferred synchronisation command can also be issued, which will wait for the local scoreboard to become zero and then signal to the consumer process that the work in question has been completed, e.g. and as will be discussed in more detail below, by incrementing the shared scoreboard.

Thus, for example, one or more scoreboards may be allocated and used to track the progress of a producer tiling process for a frame being generated by the graphics processor 5, and a consumer fragment processing process may be caused to wait for the one or more scoreboards to indicate that tiling has been completed before beginning fragment processing for the frame.

In the present embodiment, rather than the allocation of a local scoreboard from the pool being based on a predetermined allocation, the use of scoreboards in the pool by both producer and consumer processes is tracked, and then a local scoreboard is allocated for use on the basis of that tracking. Thus, in the present embodiment local scoreboards are dynamically allocated.

In the present embodiment, the tracking involves maintaining, for each (active) producer process, a record indicating which, if any, scoreboards of the pool the producer process is currently using. The tracking also involves maintaining, for each (active) consumer process, a record indicating which, if any, scoreboards of the pool the consumer process is currently using. The tracking records could be maintained by the scoreboard block 28, but in the present embodiment they are maintained by the hardware/firmware that executes the deferred synchronisation commands.

In the present embodiment, each such record comprises a bitmap comprising a bit for each scoreboard maintained by scoreboard block 28. In the present embodiment, a bit in a bitmap for a producer or consumer process being zero indicates that the process is using the scoreboard corresponding to the bit in question, whereas a bit being non-zero indicates that the process is not using the scoreboard corresponding to the bit in question. Other arrangements are possible.

In the present embodiment, the tracking information is used when allocating a scoreboard in the pool to a producer process (and consumer) process. In the present embodiment, this involves bitwise ANDing together all of the bitmaps. If the result of the bitwise AND operation is all zeros, that indicates that there are currently no scoreboards available. If the result of the bitwise AND operation includes at least one non-zero value, then that indicates that there is currently at least one scoreboard available for allocation. A scoreboard corresponding to one of the at least one non-zero values may then be allocated for use, and the bitmaps updated appropriately.

Figure 4A:
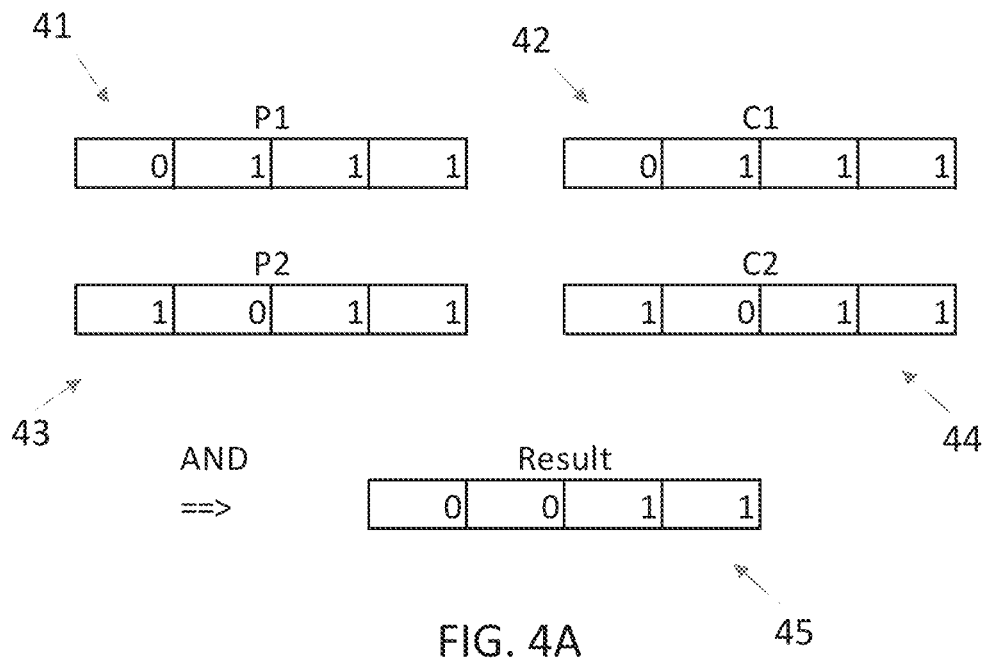
FIGS. 4A and 4B show schematically examples of a resource tracking arrangement according to an embodiment.

FIG. 4A shows schematically an example in which scoreboard block 28 maintains first, second, third and fourth scoreboards. It will be appreciated that other numbers of scoreboards are possible. In this example, a first producer P1 and a first consumer C1 are using the first scoreboard, and a second producer P2 and a second consumer C2 are using the second scoreboard. The third and fourth scoreboards are not currently in use (are free). It will be appreciated that other producer-consumer pairings and numbers of producers and consumers are possible.

As shown in FIG. 4A, to indicate that first producer P1 and first consumer C1 are using the first scoreboard, the first bit in P1's bitmap 41 and C1's bitmap 42 corresponding to the first scoreboard is set to zero. To indicate that the first producer P1 and first consumer C1 are not using any of the other scoreboards, the other bits in P1's bitmap 41 and C1's bitmap 42 are set to one.

Similarly, to indicate that second producer P2 and second consumer C2 are using the second scoreboard, the second bit in P2's bitmap 43 and C2's bitmap 44 corresponding to the second scoreboard is set to zero. To indicate that the second producer P2 and second consumer C2 are not using any of the other scoreboards, the other bits in P2's bitmap 43 and C2's bitmap 44 are set to one.

FIG. 4A also shows the result 45 of the bitwise AND operation of all four bitmaps 41-44. As shown in FIG. 4A, in this example the first and second bits in the resulting bitmap 45 are zero, indicating that the first and second scoreboards are reserved (are in use). The third and fourth bits, however, are one, indicating that the third and fourth scoreboards are currently free for allocation.

Figure 4B:
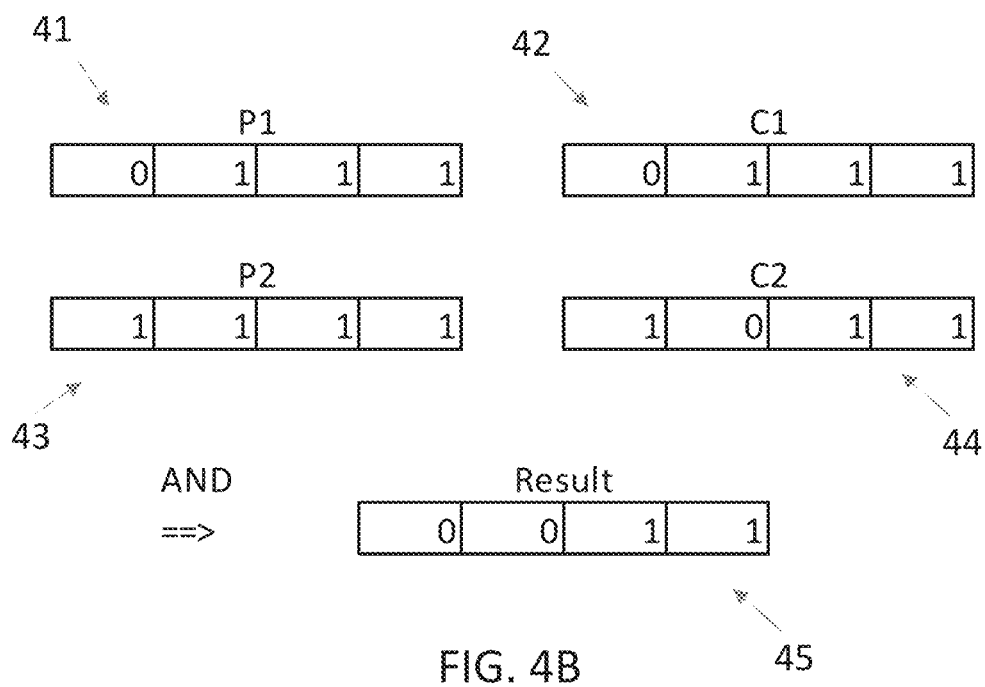

FIG. 4B illustrates the situation once the second producer P2 has completed work being tracked by the second scoreboard, but the synchronisation has not yet been taken by the second consumer C2. As shown in FIG. 4B, in this case the second bit in P2's bitmap 43 is now set to one because P2 is no longer using the second scoreboard, but the second bit in C2's bitmap 44 is still zero because it is still using the second scoreboard. As shown in FIG. 4B, in this case, the result of the bitwise AND operation still indicates that the second scoreboard is reserved (is in use).

In the present embodiment, the allocation of a scoreboard in the pool is triggered by a 'PICK_A_FREE_SB' command in a command stream. In response to a PICK_A_FREE_SB, the command stream execution unit 23 performs the bitwise AND operation using the tracking information and determines an index corresponding to a free scoreboard. In the case of no scoreboards currently being available, the PICK_A_FREE_SB command could return an indication that there is currently no scoreboard available. However, in the present embodiment the PICK_A_FREE_SB command is configured to always return an index of a free scoreboard. To do this, in the case of no scoreboards currently being available, the bitwise AND determining operation is retried until a scoreboard becomes available.

FIG. 5 shows pseudo-code illustrating an exemplary producer command stream 500 and a consumer command stream 550 according to an embodiment. As shown in FIG. 5, producer command stream 500 includes a PICK_A_FREE_SB command which returns the index of free scoreboard. A deferred sync uses R0 as the wait condition. Consumer command stream 550 correspondingly includes a WAIT command to cause the consumer processing to wait until the producer work has been completed.

Figure 6:
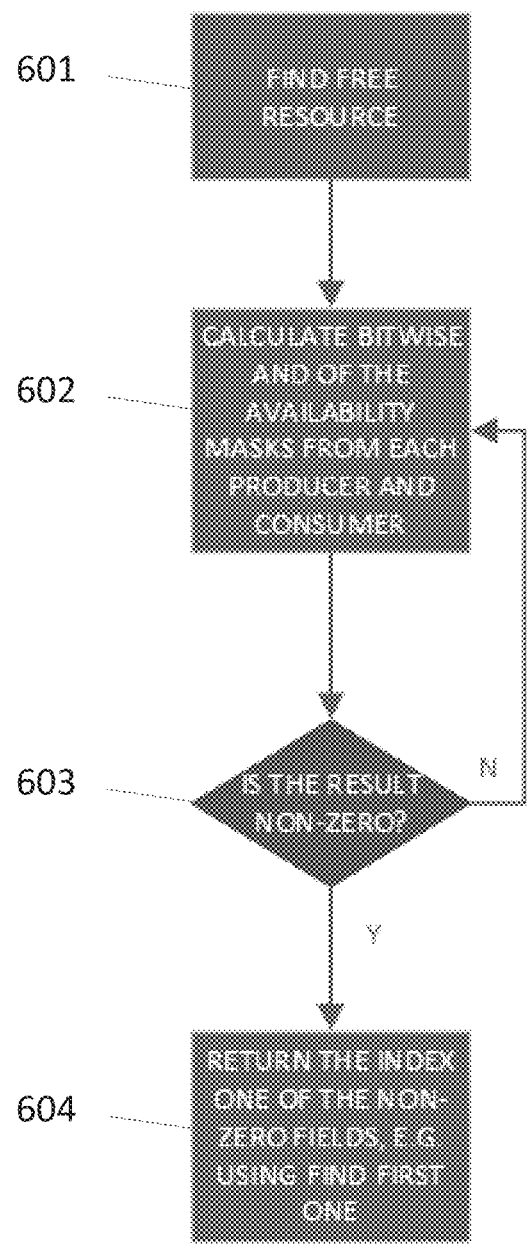
FIG. 6 illustrates a resource allocation process according to an embodiment.

FIG. 6 shows a process for allocating a (local) scoreboard according to the present embodiment. The process is triggered at step 601 by a (PICK_A_FREE_SB) command to find a free scoreboard in a producer command stream. In response to the command, all of the maintained bitmaps are bitwise ANDed together at step 602. If, at step 603, the result of the bitwise AND operation is all zeros, that indicates that there are currently no scoreboards available. In this case, as shown in FIG. 6, the bitwise AND operation is retried until a non-zero result is returned.

If, at step 603, the result of the bitwise AND operation includes at least one non-zero value, then an index corresponding to one of the non-zero values is returned at step 604. The scoreboard corresponding to the index is then allocated for use, and the bitmaps are updated appropriately.

Further embodiments will now be described.

As discussed above, the present embodiments relate in particular to the situation in which the graphics processor 5 is executing separate command streams, with one of the command streams producing data that another of the command streams consumes. An example of such a situation would be in tile based graphics processing, where a tiling process generates primitive lists for a render output to be generated, and a fragment shading process uses the primitive lists to perform fragment processing to generate the render output. In this example, the tiling process is a "producer" and the fragment shading process is a "consumer".

Figure 7:
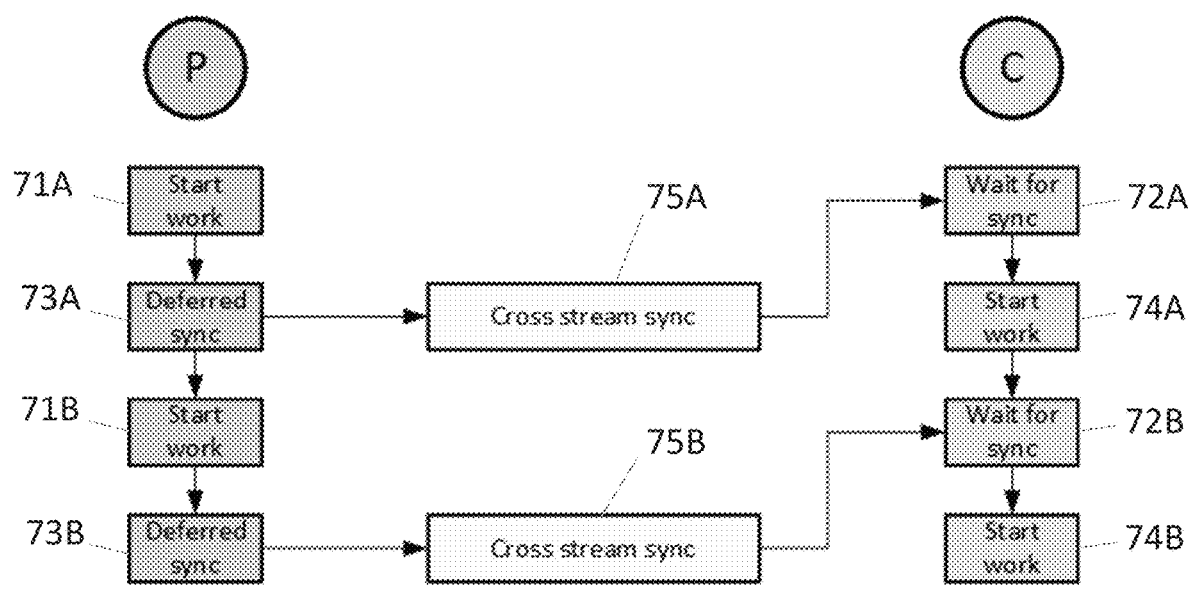
FIG. 7 illustrates a synchronisation arrangement according to an embodiment.

FIG. 7 illustrates this situation, and schematically shows a producer P command stream (e.g. for a tiling process) and a consumer C command stream (e.g. for a fragment shading process). As shown in FIG. 7, the consumer C command stream includes commands 74A, 74B (e.g. a series of run commands) that consume data (e.g. primitive lists) that is produced by commands 71A, 71B (e.g. a series of run commands) in the producer P command stream. For synchronisation purposes, the producer P command stream also includes SYNC commands 73A, 73B that cause respective synchronisation events 75A, 75B to be passed to consumer C, and the consumer C command stream correspondingly includes WAIT commands 72A, 72B that cause processing by consumer C to wait for the respective synchronisation events 75A, 75B.

For example, the first start work command 71A in the producer P command stream may be a command to start the preparation of primitive lists for a first frame to be rendered by the graphics processor 5, and the first start work command 74A in the consumer C command stream may be a command to start fragment shading for the first frame using the primitive lists prepared for the first frame. Similarly, the second start work command 71B in the producer P command stream may be a command to start the preparation of primitive lists for a second (e.g. the next) frame to be rendered by the graphics processor 5, and the second start work command 74B in the consumer C command stream may be a command to start fragment shading for the second frame using the primitive lists prepared for the second frame.

In this case, the first SYNC command 73A in the producer P command stream may cause the first synchronisation event 75A once the primitive lists for the first frame have been prepared, and the corresponding first WAIT command 72A in the consumer C command stream may cause fragment processing for the first frame to wait for the first synchronisation event 75A (indicating that the primitive lists for the first frame have been prepared). Similarly, the second SYNC command 73B in the producer P command stream may cause the second synchronisation event 75B once the primitive lists for the second frame have been prepared, and the corresponding second WAIT command 72B in the consumer C command stream may cause fragment processing for the second frame to wait for the second synchronisation event 75B (indicating that the primitive lists for the second frame have been prepared).

In this embodiment, a SYNC command 73A, 73B is emulated in firmware by the MCU 25, and a synchronisation event 75A, 75B comprises writing a synchronisation object to memory 7. A WAIT command 72A, 72B then reads a synchronisation object from memory 7.

The inventors have recognised, however, that this arrangement can be relatively slow, e.g. due to bottlenecks in the MCU 25, and due to the requirement to write and read synchronisation objects in main memory 7. Thus, a consumer C may need to wait for a relative long time before proceeding.

Figure 8A:
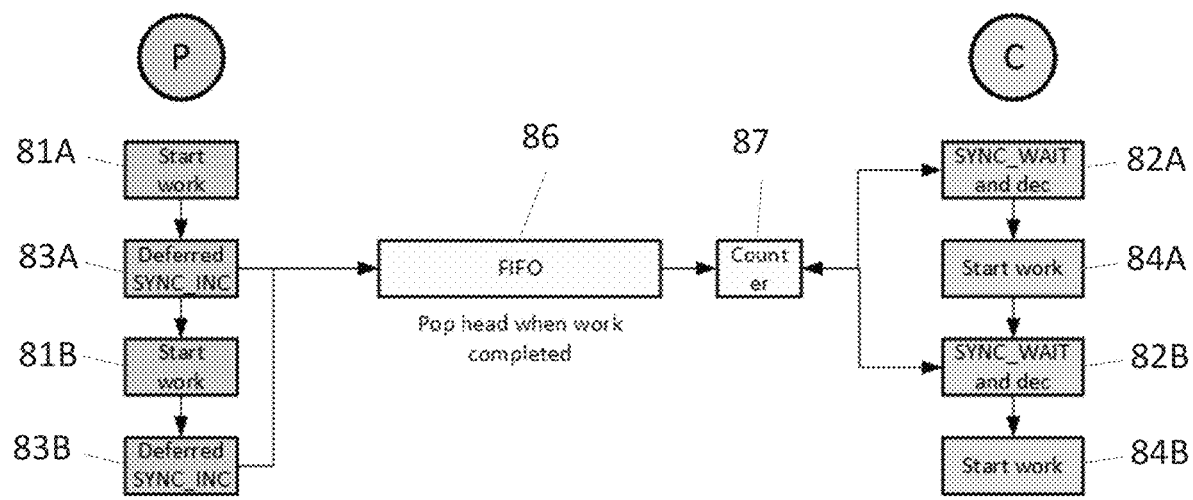
FIGS. 8A and 8B illustrate a synchronisation arrangement according to an embodiment.

FIG. 8 shows an improved synchronisation arrangement according to another embodiment. As shown in FIG. 8A, in the present embodiment, producer P and consumer C have access to a counter 87 that acts as a counting semaphore for the producer P and consumer C. In the present embodiment, the counter 87 is a scoreboard maintained by scoreboard block 28, and that is reserved for counting semaphore purposes for the producer P-consumer C pair in question.

Figure 8B:
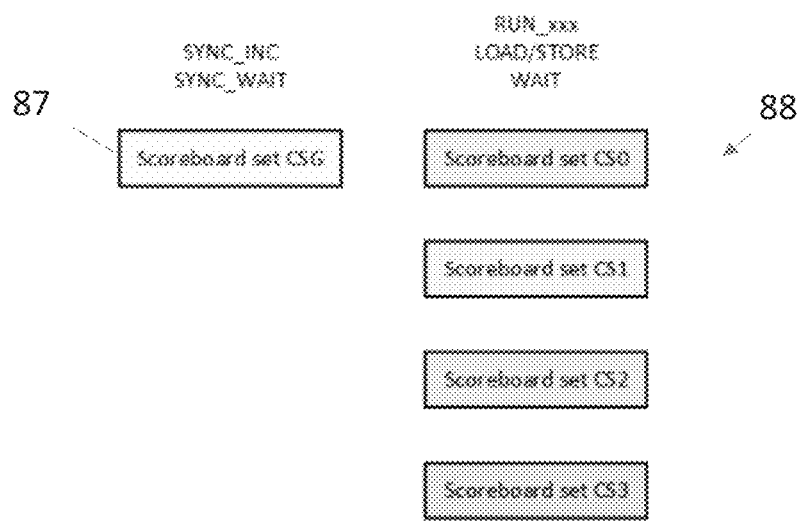

FIG. 8B illustrates an exemplary scoreboard allocation according to this embodiment. As shown in FIG. 8B, a first scoreboard 87 maintained by scoreboard block 28 is allocated for counting semaphore purposes, and may be shared by a command stream group (CSG). Other scoreboards 88 maintained by scoreboard block 28, are used for (local) work tracking and synchronisation purposes (e.g. as described above).

Returning to FIG. 8A, in this embodiment, a 'SYNC_INC' command 83A, 83B (in the producer P command stream) causes the semaphore counter 87 to be incremented (only) when an associated wait condition is satisfied. In the present embodiment, the condition is such that it is satisfied when a set of work associated with the SYNC_INC command is completed. In the present embodiment, a SYNC_INC command 83A, 83B indicates which work it is associated with (i.e. which work should be completed before the semaphore counter 87 is incremented) by indicating the one or more (other) scoreboards 88 maintained by scoreboard block 28 whose counters should become zero before the semaphore counter 87 is incremented.

In the present embodiment, a SYNC_INC command 83A, 83B is handled in hardware, e.g. rather than being emulated in firmware by the MCU 25. In particular, a deferred execution FIFO 86 (queue) is provided, and when the command stream execution unit 23 encounters a SYNC_INC command 83A, 83B in a command stream, the command stream execution unit 23 transfer the SYNC_INC command 83A, 83B to the FIFO 86. A SYNC_INC command is thus "pulled out" of the command stream, such that the command stream execution unit 23 can continue with the next command in the command stream without needing to wait for execution of the SYNC_INC command to complete. Thus, in the present embodiment, a SYNC_INC command is "deferred" command that does not stall the command stream.

In the present embodiment, the graphics processor 5 operates to monitor for the condition associated with the oldest SYNC_INC command in the FIFO 86 becoming satisfied. Thus, SYNC_INC operations are handled strictly in order. In the present embodiment, scoreboard block 28 broadcasts any changes to scoreboard(s) it is maintaining, and each time a change to a scoreboard (other than the semaphore counter 87) is broadcast, the graphics processor 5 determines whether the condition associated with the oldest SYNC_INC command in the FIFO 86 is now satisfied.

When the condition associated with the oldest SYNC_INC command in the FIFO 86 becomes satisfied, then that SYNC_INC command is removed from the FIFO 86 and executed to increment the semaphore counter 87. The local scoreboard(s) may be released once the increment operation happens.

Correspondingly, a 'SYNC_WAIT' command 82A, 82B (in the consumer C command stream) causes consumer C processing to wait until the semaphore counter 87 becomes non-zero. A SYNC_WAIT command 82A, 82B further causes the semaphore counter 87 to decrement.

The inventors have recognised that handling synchronisation commands in hardware in this manner can reduce the amount of time that a consumer C needs to wait before proceeding, e.g. as compared to emulating synchronisation commands in MCU 25 firmware. In particular, this arrangement can avoid bottlenecks in the MCU 25, and reading and writing synchronisation objects in main memory 7. Moreover, the present embodiment may be relatively cheap to implement, in particular because the counting semaphore 87 can be implemented using existing scoreboard hardware.

Although in the above embodiment, there is single FIFO 86 and semaphore counter 87 for a single producer P-consumer C pair, in other embodiments there may be one or more producers, each paired with one or more consumers. In an embodiment, each producer-consumer pair is associated with a single counting semaphore. There could be a respective FIFO for each producer-consumer pair. However, in an embodiment, there is only one FIFO for each producer P.

Figure 9:
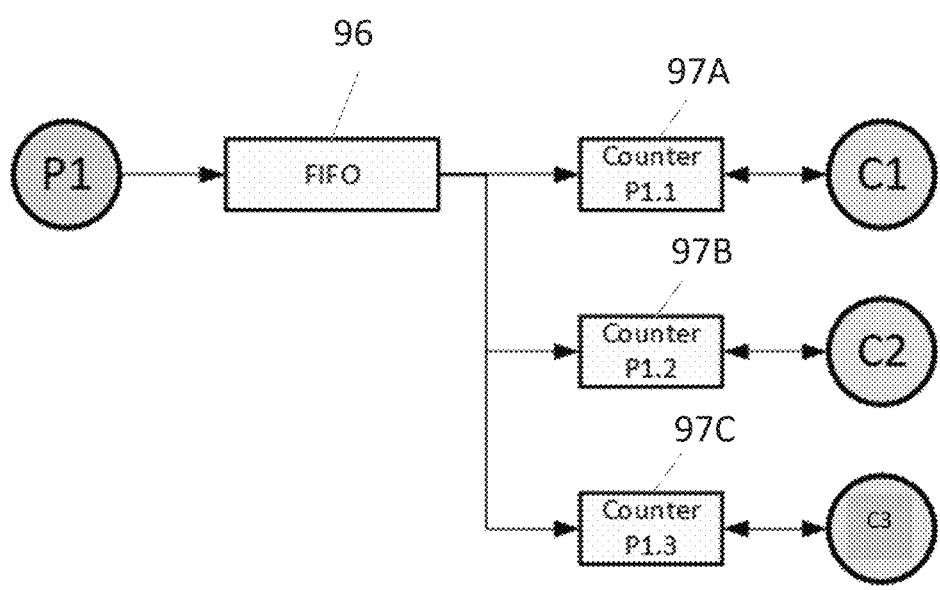
FIG. 9 illustrates a synchronisation arrangement according to an embodiment.

For example, FIG. 9 shows an embodiment in which producer P1 is paired with three consumers, C1, C2, C3. As shown in FIG. 9, in this case, each producer-consumer pair is associated with a respective counting semaphore (scoreboard) 97A-C. In particular, pair P1-C1 is associated with counter 97A, pair P1-C2 is associated with counter 97B, and pair P1-C3 is associated with counter 97C. However, as shown in FIG. 9, there is only a single FIFO 96 is associated with producer P1 and all three counters (scoreboards) 97A-C.

Figure 10:
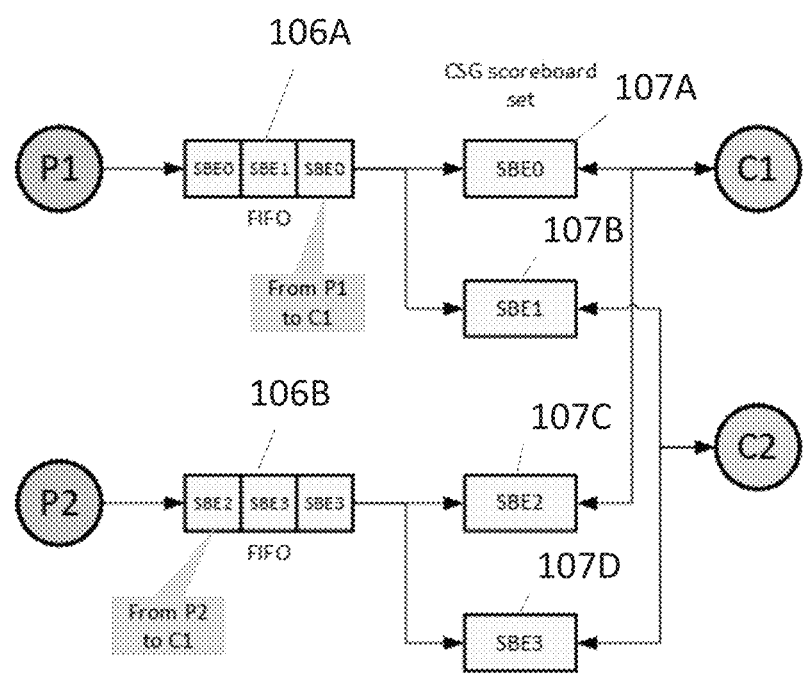
FIG. 10 illustrates a synchronisation arrangement according to an embodiment.

FIG. 10 shows another example in which a first producer P1 is paired with first and second consumers C1, C2, and a second producer P2 is paired with the first and second consumers C1, C2. As shown in FIG. 10, in this case, each producer-consumer pair is associated with a respective counting semaphore (scoreboard) 107A-D. However, there is only a single FIFO 106A-B is associated with each respective producer P1, P2.

Figure 11:
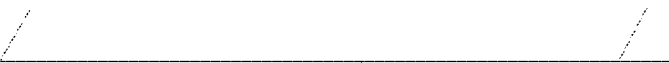
FIG. 11 illustrates producer and consumer command streams according to an embodiment.

FIG. 11 shows pseudo-code illustrating an exemplary producer command stream 111 and a consumer command stream 112 according to an embodiment. In this example, 'START_WORK' is e.g. a RUN command to start work, and 'SB_TRACK' is a command operand which determines which scoreboard is used to track the work. In this case, the scoreboard will be only be visible to P and the FIFO, and will increment when work starts and decrement when work completes.

'SB_INC' will increment the counting semaphore when the FIFO head is executed, and 'SB_DEC' will decrement the counting semaphore when the consumer "takes" the sync. In this example, command streams have access to a first local set of scoreboards (labelled "0.i" in this example) that is used to track work, and a second shared set of scoreboards (labelled "1.j" in this example) that is used to pass syncs. Although not shown in FIG. 11, when the consumer starts work, it may track using different scoreboards, e.g. "2.i", etc.

In an embodiment, the graphics processor 5 maintains a pool of plural FIFOs which can be allocated for use appropriately. In an embodiment, FIFOs in the pool can be allocated to a respective command stream interface 22, e.g. by (firmware) setting an appropriate register. In an embodiment, a FIFO is freed when the corresponding command stream interface 22 is disabled or suspended, and/or when a corresponding iterator becomes idle. In an embodiment, a status bit or event is used to detect when a FIFO is actually free.

In an embodiment, each FIFO entry includes information (e.g. a bitmap) indicating one or more scoreboards that should be monitored, and information indicating which scoreboard to increment.

In an embodiment, when suspending a command stream, the FIFO entries are saved, and when resuming the command stream, the FIFO entries are restored. Similarly, when suspending an entire command stream group (CSG), the shared semaphore scoreboard can be saved and released.

In an embodiment, if a semaphore counter reaches a maximum value, the producer is stalled or scheduling is adjusted.

Although the above has been described with particular reference to synchronising a geometry and fragment stream, other embodiments are possible. For example, in an embodiment, synchronisation between advance geometry and geometry streams in a tessellation/geometry/vert pilot process is provided. In an embodiment, synchronisation between different streams that use pipeline barriers is provided.

Although the above has been described with particular reference to allocating a scoreboard from a pool of scoreboards, in other embodiment other shared resources may be allocated in a corresponding manner. For example, a shared memory slot from a pool of memory slots may be allocated using corresponding tracking information.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A data processing system comprising:
one or more processors operable to perform producer processes to produce work to be consumed by a consumer process and consumer processes that will consume work produced by a producer process;
a pool of plural communication resources that may be used for communications between a producer process and a consumer process;
one or more communication resource usage tracking circuits configured to track the usage of communication resources of the pool of communication resources by both producer processes and consumer processes; and
a communication resource allocation processing circuit configured to attempt to allocate a communication resource from the pool of communication resources for use by a producer process that needs to communicate with a consumer process based on the tracking of the usage of communication resources of the pool of communication resources by both producer processes and consumer processes;
wherein the one or more communication resource usage tracking circuits are configured to track the usage of communication resources of the pool of communication resources by both producer processes and consumer processes by:
maintaining, for each producer process, information indicating which, if any, communication resources of the pool of communication resources the respective producer process is using; and
maintaining, for each consumer process, information indicating which, if any, communication resources of the pool of communication resources the respective consumer process is using; and
wherein the communication resource allocation processing circuit is configured to attempt to allocate a communication resource from the pool of communication resources by:
using the information maintained for each producer process and the information maintained for each consumer process to determine whether any communication resources of the pool of communication resources are not being used by any producer or consumer processes; and
when it is determined that one or more communication resources of the pool of communication resources are not being used by any producer or consumer processes, allocating a communication resource.

2. The data processing system of claim 1, wherein the pool of plural communication resources comprises a pool of memory allocations.

3. The data processing system of claim 1, wherein the pool of plural communication resources comprises a pool of scoreboards.

4. The data processing system of claim 1, wherein
the information indicating which, if any, communication resources of the pool of communication resources a respective producer process is using comprises a bitmap having entries corresponding to the communication resources of the pool of communication resources that can be set to indicate whether a corresponding communication resource is being used by the respective producer process or not; and
the information indicating which, if any, communication resources of the pool of communication resources a respective consumer process is using comprises a bitmap having entries corresponding to the communication resources of the pool of communication resources that can be set to indicate whether a corresponding communication resource is being used by the respective consumer process or not.

5. The data processing system of claim 4, wherein the communication resource allocation processing circuit is configured to
use the information maintained for each producer process and the information maintained for each consumer process to determine whether any communication resources of the pool of communication resources are not being used by any producer or consumer processes by ANDing or NORing bitmaps.

6. The data processing system of claim 1, further comprising:
a synchronisation controlling circuit configured to maintain a progress tracking record that is shared between a producer and a consumer process that can be set to indicate when the producer process has completed work required by the consumer process, and that the consumer process can check to determine whether the producer process has completed work that it requires;
wherein:
the producer process is operable to issue a deferred synchronisation command that when executed will set a progress tracking record for the producer process to indicate to a consumer process that the producer process has completed work required by the consumer process in advance of the producer process completing that work, the deferred synchronisation command having an associated wait condition such that the command will not be executed until the wait condition is met;
the synchronisation controlling circuit further configured to:
monitor progress of a producer process, and when it is determined from that monitoring that the wait condition for a deferred synchronisation command has been met, execute the deferred synchronisation command to update the progress tracking record; and
the consumer process is operable to monitor a progress tracking record and when the progress tracking record indicates that the producer process has completed the required work, proceed with the consumer process.

7. The data processing system of claim 6, wherein a progress tracking record is a communication resource allocated from the pool of communication resources by the communication resource allocation processing circuit.

8. A data processing system comprising:
one or more processors operable to perform producer processes to produce work to be consumed by a consumer process and consumer processes that will consume work produced by a producer process;
a synchronisation controlling circuit configured to maintain a progress tracking record that is shared between a producer and a consumer process that can be set to indicate when the producer process has completed work required by the consumer process, and that the consumer process can check to determine whether the producer process has completed work that it requires; and a deferred command queue;
wherein:
the data processing system is configured to queue a deferred synchronisation command in the deferred command queue; wherein the deferred synchronisation command will, when executed, set a progress tracking record for a producer process to indicate to a consumer process that the producer process has completed work required by the consumer process, and wherein the deferred synchronisation command has an associated wait condition such that the deferred synchronisation command will not be executed until the wait condition is met;
the synchronisation controlling circuit is further configured to:
monitor progress of a producer process, and when it is determined from that monitoring that the wait condition for a deferred synchronisation command at the head of the deferred command queue has been met, execute the deferred synchronisation command to update the progress tracking record; and
the consumer process is operable to monitor a progress tracking record and when the progress tracking record indicates that the producer process has completed the required work, proceed with the consumer process.

9. The data processing system of claim 8, wherein a progress tracking record comprises a counter that is incremented when a deferred synchronisation command is executed.

10. A method of operating a data processing system, the data processing system comprising:
one or more processors operable to perform producer processes to produce work to be consumed by a consumer process and consumer processes that will consume work produced by a producer process; and
a pool of plural communication resources that may be used for communication between a producer process and a consumer process;
the method comprising:
tracking the usage of communication resources of the pool of communication resources by both producer processes and consumer processes; and
when a producer process requires a communication resource from the pool of communication resources for use when communicating with a consumer process, attempting to allocate a communication resource from the pool of communication resources for use by the producer process based on the tracking of the usage of communication resources of the pool of communication resources by both producer processes and consumer processes;
wherein tracking the usage of communication resources of the pool of communication resources by both producer processes and consumer processes comprises:
maintaining, for each producer process, information indicating which, if any, communication resources of the pool of communication resources the respective producer process is using; and
maintaining, for each consumer process, information indicating which, if any, communication resources of the pool of communication resources the respective consumer process is using; and
wherein attempting to allocate a communication resource from the pool of communication resources comprises:
using the information maintained for each producer process and the information maintained for each consumer process to determine whether any communication resources of the pool of communication resources are not being used by any producer or consumer processes; and
when it is determined that one or more communication resources of the pool of communication resources are not being used by any producer or consumer processes, allocating a communication resource.

11. The method of claim 10, wherein the pool of plural communication resources comprises a pool of memory allocations.

12. The method of claim 10, wherein the pool of plural communication resources comprises a pool of scoreboards.

13. The method of claim 10, wherein
the information indicating which, if any, communication resources of the pool of communication resources a respective producer process is using comprises a bitmap having entries corresponding to the communication resources of the pool of communication resources that can be set to indicate whether a corresponding communication resource is being used by the respective producer process or not; and
the information indicating which, if any, communication resources of the pool of communication resources a respective consumer process is using comprises a bitmap having entries corresponding to the communication resources of the pool of communication resources that can be set to indicate whether a corresponding communication resource is being used by the respective consumer process or not.

14. The method of claim 13, wherein
using the information maintained for each producer process and the information maintained for each consumer process to determine whether any communication resources of the pool of communication resources are not being used by any producer or consumer processes comprises ANDing or NORing bitmaps.

15. The method of claim 10, further comprising:
when a producer process is producing work for use by a consumer process, and in which the consumer process needs to wait for work produced by the producer process before it can proceed:
maintaining a progress tracking record that is shared between the producer and consumer processes that can be set to indicate when the producer process has completed work required by the consumer process, and that the consumer process can check to determine whether the producer process has completed work that it requires;
the producer process issuing a deferred synchronisation command that when executed will set the progress tracking record to indicate to the consumer process that the producer process has completed work required by the consumer process in advance of the producer process completing that work, the deferred synchronisation command having an associated wait condition such that the command will not be executed until the wait condition is met;
the method further comprising:
monitoring progress of the producer process, and when it is determined from that monitoring that the wait condition for the deferred synchronisation command has been met, executing the deferred synchronisation command to update the progress tracking record; and
the consumer process monitoring the progress tracking record and when the progress tracking record indicates that the producer process has completed the required work, proceeding with the consumer process.

16. The method of claim 15, wherein the progress tracking record is a communication resource allocated from the pool of communication resources.

17. A method of operating a data processing system that comprises;
one or more processors operable to perform producer processes to produce work to be consumed by a consumer process and consumer processes that will consume work produced by a producer process; and
a deferred command queue;
the method comprising:
when a producer process is producing work for use by a consumer process, and in which the consumer process needs to wait for work produced by the producer process before it can proceed:
maintaining a progress tracking record that is shared between the producer and consumer processes that can be set to indicate when the producer process has completed work required by the consumer process, and that the consumer process can check to determine whether the producer process has completed work that it requires;
issuing a deferred synchronisation command; wherein the deferred synchronisation command will, when executed, set the progress tracking record to indicate to the consumer process that the producer process has completed work required by the consumer process, and wherein the deferred synchronisation command having has an associated wait condition such that the deferred synchronisation command will not be executed until the wait condition is met;
queuing the deferred synchronisation command in the deferred command queue;
monitoring progress of the producer process, and when the deferred synchronisation command is at the head of the deferred command queue and it is determined from that monitoring that the wait condition for the deferred synchronisation command has been met, executing the deferred synchronisation command to update the progress tracking record; and
the consumer process monitoring the progress tracking record and when the progress tracking record indicates that the producer process has completed the required work, proceeding with the consumer process.

18. The method of claim 17, wherein the progress tracking record comprises a counter that is incremented when the deferred synchronisation command is executed.

19. A non-transitory computer readable storage medium storing software code which when executing on a processor performs using one or more processors operable to perform producer processes to produce work to be consumed by a consumer process and consumer processes that will consume work produced by a producer process, and a pool of plural communication resources that may be used for communication between a producer process and a consumer process, the method comprising:
tracking usage of communication resources of the pool of communication resources by both producer processes and consumer processes; and
when a producer process requires a communication resource from the pool of communication resources for use when communicating with a consumer process, attempting to allocate a communication resource from the pool of communication resources for use by the producer process based on the tracking of the usage of communication resources of the pool of communication resources by both producer processes and consumer processes;
wherein tracking the usage of communication resources of the pool of communication resources by both producer processes and consumer processes comprises:
maintaining, for each producer process, information indicating which, if any, communication resources of the pool of communication resources the respective producer process is using; and
maintaining, for each consumer process, information indicating which, if any, communication resources of the pool of communication resources the respective consumer process is using; and
wherein attempting to allocate a communication resource from the pool of communication resources comprises:
using the information maintained for each producer process and the information maintained for each consumer process to determine whether any communication resources of the pool of communication resources are not being used by any producer or consumer processes; and
when it is determined that one or more communication resources of the pool of communication resources are not being used by any producer or consumer processes, allocating a communication resource.

* * * * *